United States Patent
Agarwal et al.

(10) Patent No.: US 9,330,413 B2
(45) Date of Patent: May 3, 2016

(54) CHECKOUT AND/OR ORDERING SYSTEMS AND METHODS

(71) Applicant: Sears Brands, L.L.C., Hoffman Estates, IL (US)

(72) Inventors: Shubham Agarwal, Arlington Heights, IL (US); Abhishek Ramani, St. Charles, IL (US); Kartik Subramanian, Chicago, IL (US); Vijan Bhaumik, Bloomingdale, IL (US); Robert C Hudson, Naperville, IL (US); G. Mercedes DeLuca, Saratoga, CA (US); Giuseppe Mario Di Prizio, Chicago, IL (US); Richard Kevin Lyons, Lake in the Hills, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 442 days.

(21) Appl. No.: 13/826,128

(22) Filed: Mar. 14, 2013

(65) Prior Publication Data

US 2014/0279191 A1    Sep. 18, 2014

(51) Int. Cl.

| | |
|---|---|
| *G06Q 30/00* | (2012.01) |
| *G06Q 20/00* | (2012.01) |
| *G06Q 30/06* | (2012.01) |
| *G06Q 20/20* | (2012.01) |

(52) U.S. Cl.
CPC ............ *G06Q 30/0633* (2013.01); *G06Q 20/20* (2013.01); *G06Q 30/06* (2013.01)

(58) Field of Classification Search
CPC ... G06Q 20/20; G06Q 30/06; G06Q 30/0631; G06Q 30/0633

USPC ................................. 705/26.7, 26.8; 235/383
See application file for complete search history.

(56) References Cited

U.S. PATENT DOCUMENTS

| | | |
|---|---|---|
| 5,960,411 A | 9/1999 | Hartman et al. |
| 6,026,375 A | 2/2000 | Hall et al. |
| 6,880,750 B2 | 4/2005 | Pentel |
| 8,200,550 B2 | 6/2012 | Altkins |

(Continued)

FOREIGN PATENT DOCUMENTS

| | | |
|---|---|---|
| WO | 2004072762 | 8/2004 |
| WO | 2008014255 | 1/2008 |
| WO | 2011005072 | 1/2011 |

OTHER PUBLICATIONS

Boyce, C., "Shoppers Cast a Wider Net as Many Integrate Their Online, in-Store Browsing," Knight Ridder Tribune Business News, Dec. 23, 2004.*

(Continued)

*Primary Examiner* — Nicholas D Rosen
(74) *Attorney, Agent, or Firm* — McAndrews, Held & Malloy, Ltd.

(57) ABSTRACT

Methods and apparatus are disclosed provide various enhancements and/or improvements to the conventional shopping process used by brick-and-mortar stores. In some embodiments, a customer may use a mobile computing device, such as a smart phone, to select and pay for items in a brick-and-mortar store. Such shopping process may permit the customer to purchase numerous items without the using of shopping basket or a wheeled shopping cart. The shopping process may further permit the customer to pay for items and leave the store with such items without waiting in a checkout line.

20 Claims, 7 Drawing Sheets

Fig. 6

(56) References Cited

U.S. PATENT DOCUMENTS

| | | | | |
|---|---|---|---|---|
| 8,370,271 | B1* | 2/2013 | Robinson | G06Q 10/083 705/26.7 |
| 2002/0111881 | A1 | 8/2002 | Walker et al. | |
| 2002/0143655 | A1 | 10/2002 | Elston et al. | |
| 2002/0161664 | A1* | 10/2002 | Shaya | G06Q 30/02 705/7.31 |
| 2006/0076397 | A1 | 4/2006 | Langos | |
| 2006/0178943 | A1 | 8/2006 | Rollinson et al. | |
| 2007/0067200 | A1* | 3/2007 | Patel | G06Q 10/06 705/7.14 |
| 2007/0078727 | A1* | 4/2007 | Spiegel | G06Q 30/06 705/26.8 |
| 2007/0088624 | A1 | 4/2007 | Vaughn et al. | |
| 2007/0106468 | A1 | 5/2007 | Eichenbaum et al. | |
| 2007/0138268 | A1 | 6/2007 | Tuchman | |
| 2007/0257774 | A1 | 11/2007 | Stumpert et al. | |
| 2008/0046331 | A1* | 2/2008 | Rand | G06Q 30/00 705/26.81 |
| 2008/0228600 | A1 | 9/2008 | Treyz et al. | |
| 2009/0187488 | A1 | 7/2009 | Shamilian | |
| 2009/0265247 | A1* | 10/2009 | Carroll | G06Q 20/20 705/15 |
| 2009/0281903 | A1 | 11/2009 | Blatstein | |
| 2010/0088148 | A1 | 4/2010 | Presswala et al. | |
| 2010/0185504 | A1* | 7/2010 | Rajan | G06Q 30/02 705/14.13 |
| 2010/0293106 | A1 | 11/2010 | Rhoads et al. | |
| 2011/0130129 | A1 | 6/2011 | Snyder et al. | |
| 2011/0258058 | A1 | 10/2011 | Carroll et al. | |
| 2012/0191551 | A1* | 7/2012 | Lutnick | G06Q 20/20 705/15 |
| 2012/0209749 | A1* | 8/2012 | Hammad | G06Q 30/06 705/27.1 |
| 2012/0284101 | A1* | 11/2012 | Schiller | G06Q 30/06 705/14.23 |
| 2012/0290436 | A1* | 11/2012 | Frost | G06Q 30/06 705/26.41 |
| 2013/0054395 | A1* | 2/2013 | Cyr et al. | 705/21 |
| 2013/0096966 | A1 | 4/2013 | Barnes | |
| 2013/0103537 | A1* | 4/2013 | Hewett | 705/26.7 |
| 2013/0151335 | A1* | 6/2013 | Avadhanam et al. | 705/14.53 |
| 2014/0188601 | A1* | 7/2014 | Buset et al. | 705/14.49 |

OTHER PUBLICATIONS

Anon., "Gocery store" article on Wikipedia, https://en.wkipedia.org/wki/Grocery_store, Nov. 19, 2015.*

Collins, Galen R., "Creating Usable Mobile Ambient Intelligent Applications for Hospitality Customers," Jul. 31, 2010, http://scholarworks.umass.edu/refereed/CHRIE_2010/Saturday/9.*

International Search Report and Written Opinion for PCT/US12/69149, dated Feb. 19, 2013.

Mo et al, "RFID Infrastructure for Large Scale Supply Chains Involving Small and Medium Enterprises.", In: Sustainable Radio Frequency Identification Solutions, Bok edited by: Cristina Turcu, ISBN 978-953-7619-74-9, pp. 356, Feb. 2010, INTECh, Croatia, downloaded from sciyo.com.

"More Casual Restaurants trying Curbside Delivery", Horovitz, May 30, 2002, retrieved from http://usatoday30.usatoday.com/money/general/2002/05/31/curbside-dinig.htm.

"Publix Cancels Curbside Pickup", Jan. 22, 2012, retrieved from http://retailtechnologytrends.com/tag/augmented-reality, p. 8.

"Retro Drive-in with Curbside Pickup", Sep. 18, 2012, retrieved from http://blog.munchery.com/2012/09/retro-drive-in-with-curbside-pickup, p. 1.

International Search Report and Written Opinion for PCT/US2013/023202, dated May 15, 2013.

Ex Parte Reexamination Certificate for U.S. Pat. No. 5,960,411, dated Jul. 13, 2010.

"Grocery Gadget Shopping List for iPhone, Droid, Blackberry, Nokia, Flixoft", Grocerygadgets.com/gadgets/grocery-gadget.aspx, dated Mar. 5, 2013, pp. 1 and 2.

"Grocery IQ: Grocery Shopping Made Simple", www.groceryiq.com, dated Mar. 5, 2013, pp. 1 and 2.

Intended Design, dated Mar. 5, 2013, pp. 1 and 2.

"Walmart Tests iPhone app checkout feature", Reuters.com, dated Mar. 5, 2013, pp. 1 and 2.

"What's New in Shopper iPHone", www.myshopperapp.com, dated Mar. 5, 2013, pp. 1-15.

* cited by examiner

CHECKOUT AND/OR ORDERING SYSTEMS AND METHODS

FIELD OF THE INVENTION

The present description relates generally to shopping, and more particularly to systems and methods for enhancing the shopping experience.

BACKGROUND OF THE INVENTION

Customers commonly visit brick-and-mortar stores such as retail stores, grocery stores, consumer electronic boutiques, etc. in order to purchase goods from such stores. When visiting such stores, a customer often fills a shopping basket or wheeled shopping cart with items selected for purchase. After filling the shopping basket or wheeled shopping cart with items, the customer then proceeds to a checkout lane where a sales associate enters each item into a point of sale terminal in order to determine the total purchase price for the items selected by the customer. Moreover, the sales associate collects payment from the customer and provides the customer with a sales receipt or some other form of proof of purchase for the selected and paid for items. After checking out via one of the provided checkout lanes, the customer is then free to leave the brick-and-mortar store with the purchased items.

While the above conventional shopping and checkout process is generally effective, there are times in which the above process does not work well. For example, during periods of high activity (e.g., the Christmas shopping season), a brick-and-mortar store may simply be unable to keep up with the flow of customers resulting in long waits at the checkout lanes. During such periods, it is not uncommon for customers to abandon carts full of merchandise and leave the store empty handed. Not only is such behavior costly from the standpoint of lost sales, but such abandonments also increase the cost of operation due to time spent returning the abandoned items to their appropriate place in the store. The matter is even worse if the abandoned items include perishable items (e.g., ice cream) and an employee does not discover the abandoned items until after such perishable items have spoiled thus rendering such items unsuitable for sale and possibly rendering other non-perishable items in the same cart/basket also unsuitable for sale.

Besides discussed issues resulting in abandonment of selected items, other aspects of the conventional brick-and-mortar shopping experience may also be improved and/or enhanced. The following provides numerous methods and systems which attempt to improve and/or enhance various aspects of the conventional shopping experience. To this end, limitations and disadvantages of conventional and traditional approaches should become apparent to one of skill in the art, through comparison of such systems with aspects of the present invention as set forth in the remainder of the present application.

BRIEF SUMMARY OF THE INVENTION

Systems and methods for enhancing a shopping experience are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention are related to enhancing a shopping experience, especially a brick-and-mortar shopping experience. More specifically, certain embodiments of the present invention relate to systems and methods that utilize a mobile computing device such as a smart phone to enhance and/or improve aspects of ordering and/or checking out for a brick-and-mortar store such as a retail store, department store, consumer mall, grocer store, etc.

Ordering/Check-Out System

Figure 1:
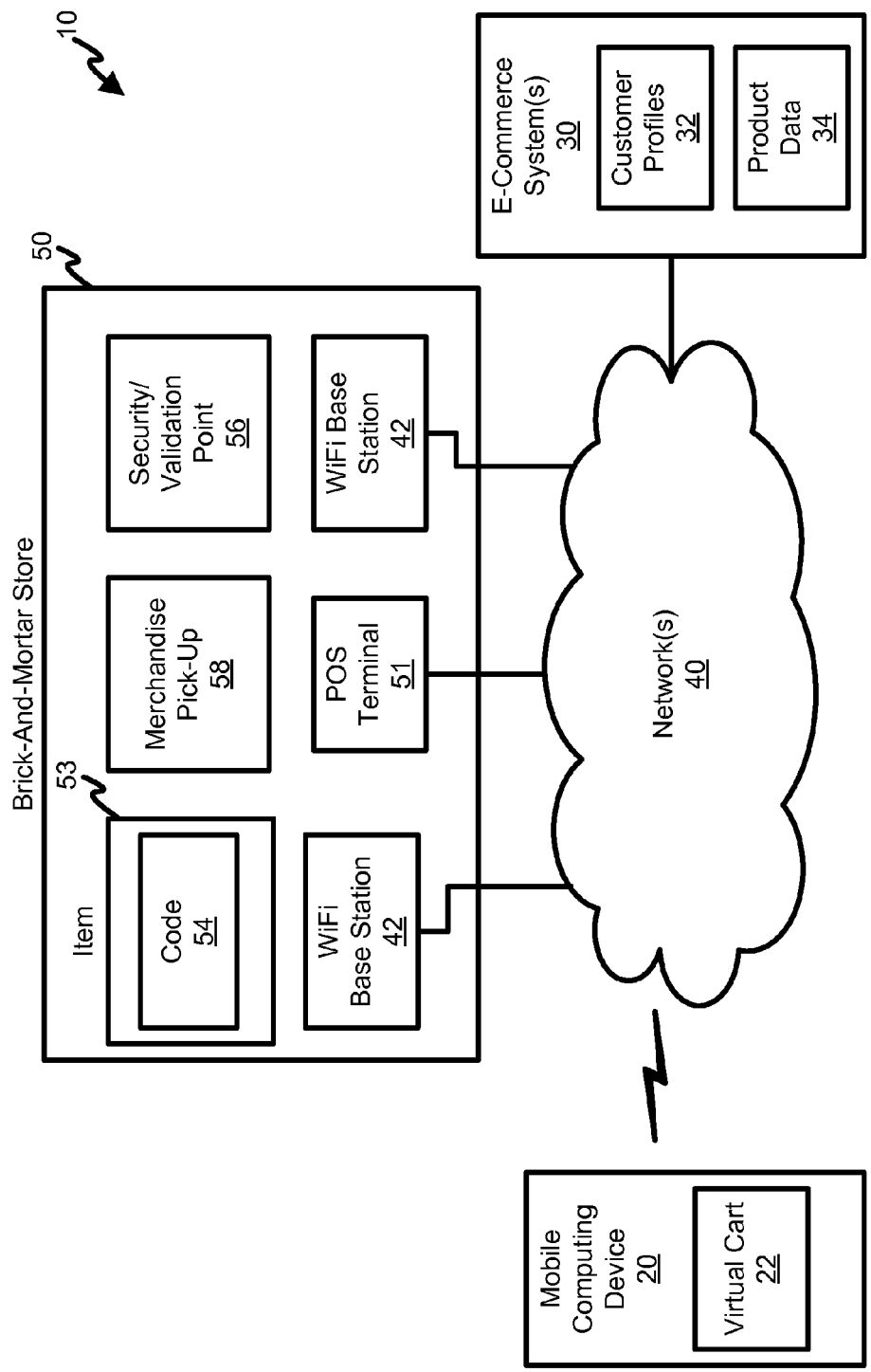
FIG. 1 shows an ordering and/or checkout system in accordance with an embodiment of the present invention.

Today's customers demand convenience, speed, and selection from their retailers regardless of whether such customers are shopping online at various online vendors or are shopping in a brick-and-mortar store. The following describes various ways a mobile computing device such as a tablet, smart phone, mobile phone, personal data assistant, hand-held gaming console, or some other form of mobile computing device may be used to enhance a brick-and-mortar shopping experience. To this end, a high level system diagram for an ordering and/or checkout system 10 is depicted in FIG. 1. As explained in more detail below, the system 10 is generally applicable to each of the use cases and/or embodiments presented in detail below.

As shown, the system 10 may include a mobile computing device 20 connected to an e-commerce system 30 via one or more networks 40. The networks 40 may include a number of private and/or public networks such as, for example, wireless and/or wired LAN networks, cellular networks, and the Internet that collectively provide a communication path and/or paths between the mobile computing devices 20 and the one or more e-commerce system 30. The mobile computing devices 20 may include tablets, smart phones, mobile phones, personal data assistants, hand-held gaming consoles, and/or other forms of mobile computing devices which enable a user to communicate with the e-commerce system 30 via the network 40.

In one embodiment, the network 40 may include a number of WiFi base stations 42 distributed throughout a brick-and-mortar store 50. Such WiFi base stations 42 may provide wireless network connectivity to mobile computing devices 20 used within the brick-and-mortar store 50, and thus permit such mobile computing devices 20 to wirelessly communicate with e-commerce system 30 via network 40.

The e-commerce system 30 may include one or more web servers, database servers, routers, load balancers, and/or other computing and/or networking devices. As explained in greater detail below, the e-commerce system 30 may operate to provide various enhancements and/or improvements to a user's shopping experience associated with the brick-and-mortar store 50. To this end, the e-commerce system 30 may maintain customer profiles 32 for various customers that utilize the shopping services provided by the system 10. Moreover, the e-commerce system 30 may maintain various information 34 regarding products or items for sale by the brick-and-mortar store 50.

As shown, the brick-and-mortar store 50 may include WiFi base stations 42 positioned at different locations through the store in order to provide wireless connectivity to mobile computing devices 20 used within the store 50. The store 50 may further include numerous items 53, which are on display for purchase by customers of the store 50. For example, the store 53 may include shelves, clothing racks, tables, and/or other assemblies upon which items 53 may be placed in a customer accessible manner so that the customer may physically interact with the items 53. More specifically, the store 53 may display the items 53 in a manner which permits a customer to pick-up the items 53 they want to purchase and place them in a shopping basket or wheeled shopping cart. The customer may then carry the items to a point of sale (POS) terminal 51 where a store associate may scan the selected items 53, determine a total purchase price for the selected items 53, and received payment from the customer for the selected items 53.

Figure 3:
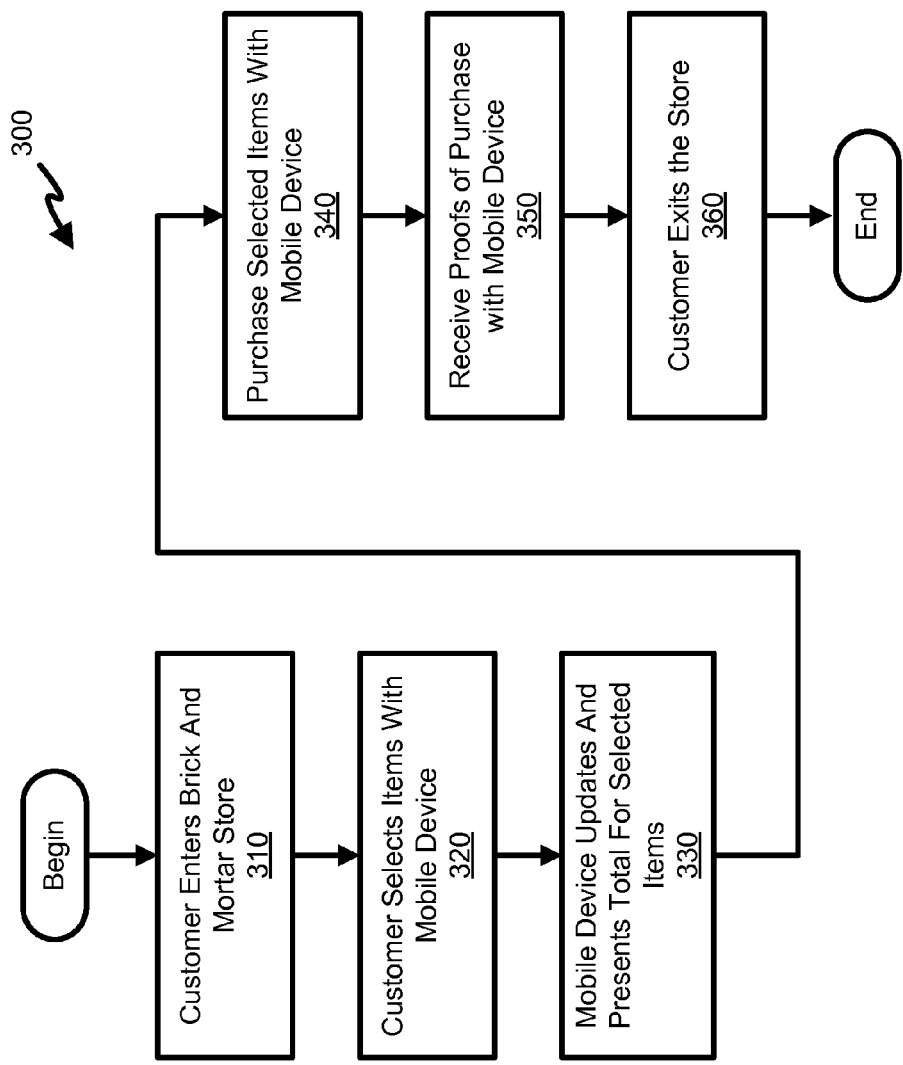
FIG. 3 shows a shopping process suitable for the system of FIG. 1

Besides supporting sales via POS terminals 51, the store 50 may further permit the sale of items 53 via an enhanced shopping process 300 explained below in regard to FIG. 3. In one embodiment, the enhanced shopping process 300 permits a customer to select and/or purchase items 53 using a mobile computing device 20 without waiting in a checkout line so that a store associate may scan the items 53 and collect payment for such items 53.

Computing Device

Those skilled in the art readily appreciate that FIG. 1 depicts the ordering and/or checkout system 10 at a high level and that the system 10 may be implemented in numerous different manners using a wide range of different computing devices, platforms, networks, etc. Moreover, those skilled in the art readily appreciate that aspects of the system 10 may be implemented using a client/server architecture, a peer-to-peer (P2P) architecture, and/or another networking architecture.

Figure 2:
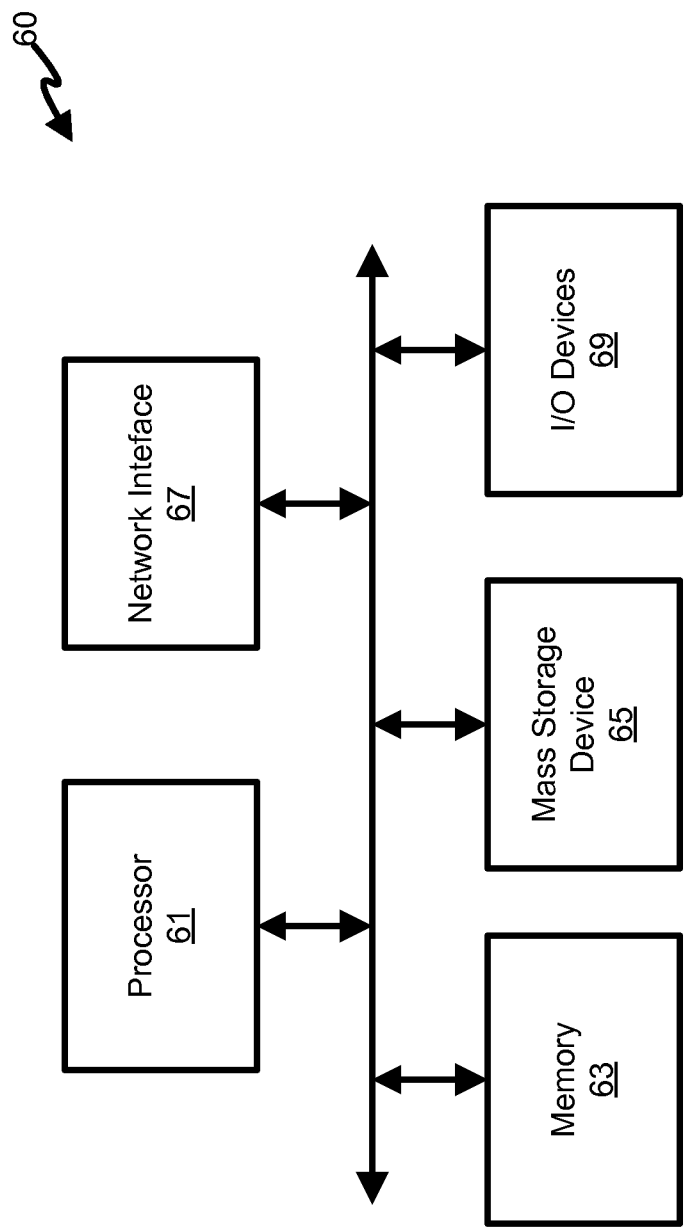
FIG. 2 shows a simplified depiction of a computing device for use in the system of FIG. 1.

As noted above, the mobile computing device 20 and the e-commerce system 30 may be implemented using various types of computing devices. Similarly, the POS terminals 51 may be implemented using various types of computing devices. FIG. 2 provides a simplified depiction of a computing device 60 suitable for implementing the mobile computing device 20, the point of service terminals 51, and/or aspects of the e-commerce system 30. As shown, the computing device 60 may include a processor 61, a memory 63, a mass storage device 65, a network interface 67, and various input/output (I/O) devices 69. The processor 61 may be configured to execute instructions, manipulate data and generally control operation of other components of the computing device 60 as a result of its execution. To this end, the processor 61 may include a general purpose processor such as an x86 processor or an ARM processor which are available from various vendors. However, the processor 61 may also be implemented using an application specific processor and/or other circuitry.

The memory 63 may include various types of random access memory (RAM) devices, read only memory (ROM) devices, flash memory devices, and/or other types of volatile or non-volatile memory devices. In particular, such memory devices of the memory 63 may store instructions and/or data to be executed and/or otherwise accessed by the processor 61. In some embodiments, the memory 63 may be completely and/or partially integrated with the processor 61.

In general, the mass storage device 65 may store software and/or firmware instructions which may be loaded in memory 63 and executed by processor 61. The mass storage device 65 may further store various types of data which the processor 61 may access, modify, and/otherwise manipulate in response to executing instructions from memory 63. To this end, the mass storage device 65 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 67 may enable the computing device 60 to communicate with other computing devices via network 40. To this end, the networking interface 67 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc.) or near field communication (NFC) interface, and/or some other type of networking interface capable of providing a communications link between the computing device 60 and network 40 and/or another computing device.

Finally, the I/O devices 69 may generally provide devices which enable a user to interact with the computing device 60 by either receiving information from the computing device 60 and/or providing information to the computing device 60. For example, the I/O devices 69 may include display screens, keyboards, mice, touch screens, microphones, audio speakers, digital cameras, optical scanners, RF transceivers, etc.

While the above provides some general aspects of a computing device 60, those skilled in the art readily appreciate that there may be significant variation in actual implementations of a computing device. For example, a smart phone implementation of a computing device generally uses different components and may have a different architecture than a database server implementation of a computing device. However, despite such differences, computing devices still generally include processors that execute software and/or firmware instructions in order to implement various functionality. As such, the above described aspects of the computing device 60 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Enhanced Shopping Process

As mentioned above, the system 10 may support or provide various enhancements and/or improvements to the conventional brick-and-mortar shopping process. One such enhancement/improvement permits a customer to use a mobile computing device 20 to purchase items 53 on display or otherwise presented for purchase from a brick-and-mortar store 50 without personally collecting the items 53 throughout the store and/or without waiting in a checkout lane in order to purchase the selected items 53 from a store associate operating a POS terminal 51. Further details regarding such an enhanced shopping process 300 are depicted in FIG. 3.

As shown, the customer at 310 may physically visit a brick-and-mortar store 50. Upon arrival at the brick-and-mortar store 50, the customer may forgo grabbing a shopping basket or a wheeled shopping cart. Instead, the customer at 320 may use a mobile computing device 20 to select items 53 and add such items 53 to a virtual shopping cart 22 maintained by the mobile computing device 20 and/or e-commerce system 30. In some embodiments, the customer may use their own mobile computing device 20 which includes a shopping application provided by or otherwise compatible with the brick-and-mortar store 50. Alternatively and/or in addition to, the brick-and-mortar store 50 may provide mobile computer devices 20 to customers that support one or more aspects of the shopping process 300.

While the above mentions that the customer may forgo grabbing a shopping basket or wheeled shopping cart, some embodiments of shopping process 300 do not force the customer into an all or nothing proposition. In particular, some embodiments may permit the customer to still use a shopping basket and/or wheeled shopping cart for some or all of their purchased items. Even in situations where the customer elects to place all items 53 in their wheeled shopping cart, the mobile computing device 20 may still enhance and improve aspects of the customer's shopping experience as explained herein.

Regardless, the customer at 320 may move through the store and use the mobile computing device 20 to select items 53 and place such items in their virtual shopping cart 22. As the customer adds items to their virtual cart 22, the mobile computing device 20 at 330 may further update a purchase price total for the items in the virtual cart 22 and present such total to the customer via a display of the mobile computing device 22. In some embodiments, the mobile computing device 20 may present a raw total of the items 53 placed in the virtual cart 22. Such a raw total may not account for sales tax, sales promotions, discounts, coupons, service fees, deliver fees, etc. In other embodiments, the mobile computing device 20 may take into account one or more such aspects in order to provide the customer with a more accurate assessment of the final cost of the selected items 53. In some embodiments, the mobile computing device 20 may further present an identification of the amount saved as a result of promotions, coupons, discounts, marked down items, etc. to reassure the customer that they are receiving a "good deal" on the items 53 placed in their virtual cart 22.

In some embodiments, the mobile computing device 20 may include one or more I/O devices 69 suitable for identifying an item 53 which the customer wishes to purchase. For example, the mobile computing device 20 may include a digital image sensor (e.g., a digital camera), an optical scanner, an RF transceiver, a near field communication (NFC) transceiver, and/or some other device suitable for reading, scanning, and/or imaging codes 54 associated with items 53. In such embodiments, the customer may select items 53 and place them in their virtual cart 22 by reading, scanning, imaging, etc. various codes 54 associated with the items 53. In particular, the mobile computing device 20 may support reading, scanning, and/or imaging a large variety of codes such as bar codes, Universal Product Codes (UPC), Quick Response (QR) codes, Augmented Reality (AR) codes, radio-frequency identification (RFID) tags, near field communication (NFC) codes. Moreover, such codes 54 may be attached to the item 53, to tags or labels that are attached to the item 53, and/or tags or labels that are otherwise associated with the item 53. For example, such codes 54 may be placed upon display signs for the item 53, shelf tags for the item 53, or at some other locale associated with the item 54 so that the customer may readily scan, read, image such codes 54 with the mobile computing device 20.

Besides using the mobile computing device 20 to select items 53 and place such items in a virtual cart 22, the customer may also use the mobile computing device 20 at 340 to purchase the items in their virtual cart 22. For example, the customer may enter credit card and/or other payment information via the mobile computing device 20. The mobile computing device 20 may transmit such information to the e-commerce system 30 which may verify payment information and provide at 350 the mobile computing device 20 with one or more proofs of purchase (e.g., a digital receipt, bar codes, etc.) for the items 53 in the virtual cart 22. After paying for the selected items 53 and receiving proofs of purchase, the customer at 360 may leave the store 50.

In some embodiments, the customer may choose a manner of fulfillment for each item in their virtual cart 22. In particular, the customer in one embodiment may choose whether a particular item is to be picked-up, shipped, or carried with the customer. In particular, the mobile computing device 20 at 320 may request the customer to choose a fulfillment option for each item 53 as its placed in their virtual cart 22 (e.g., as the customer scans the bar code associated with each item). Since such constant queries may become tedious to the customer, the mobile computing device 20 at 320 may assume a default fulfillment option (e.g., shipped) for each item 53 unless the customer indicates a different option for the item 53. The mobile computing device 20 may further permit the customer to choose the default fulfillment option and/or permit the customer to set a fulfillment option for the complete order. In some embodiments, the mobile computing device 20 may permit the customer to review and revise the fulfillment option for each item 53 in the virtual cart 22 as part of the payment process conducted at 340.

Figure 4:
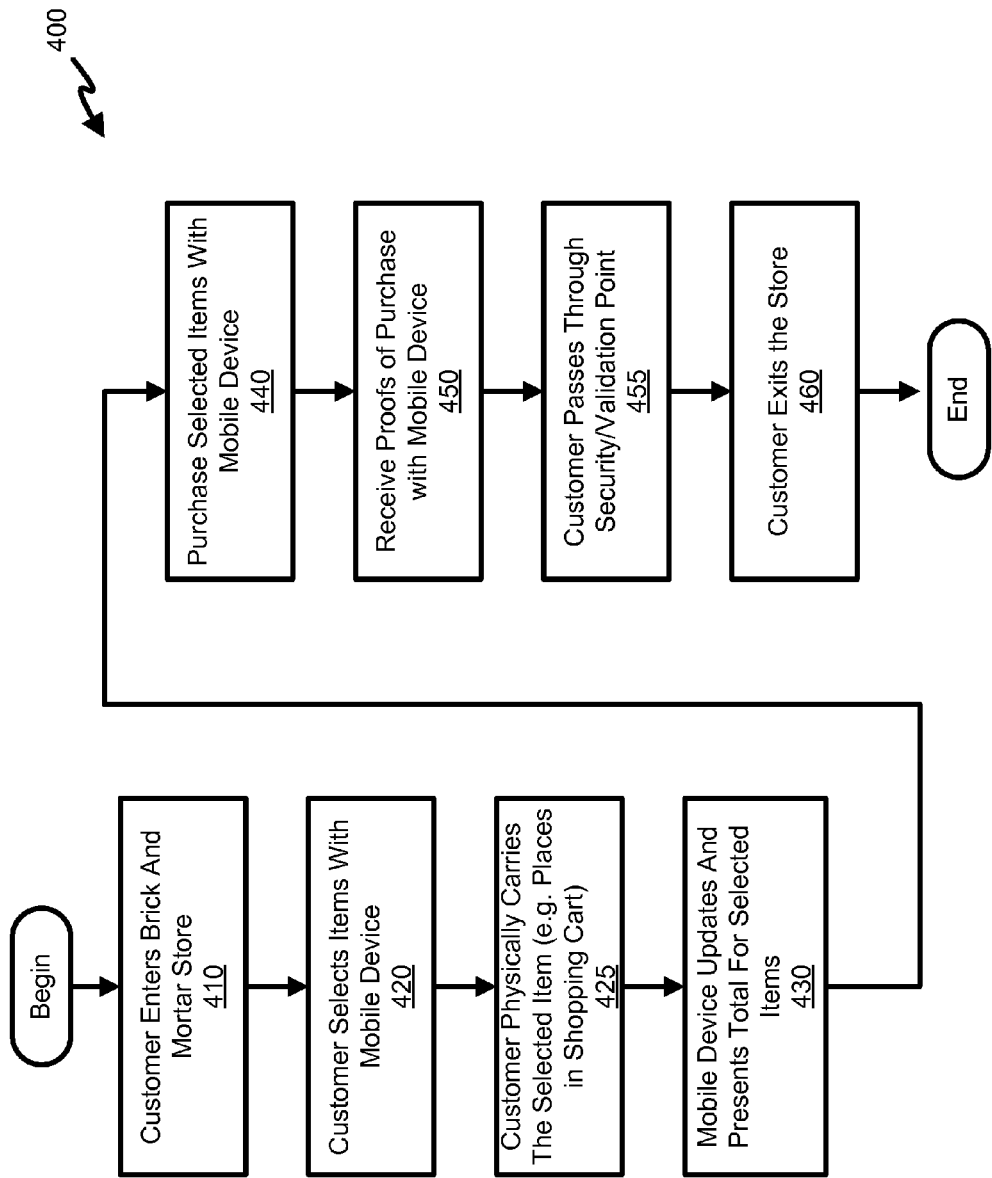
FIG. 4 shows additional details of a shopping process utilizing a "carry with me" fulfillment option suitable for the system of FIG. 1.

Referring now to FIG. 4, a shopping process 400 that highlights aspects of a "carry with me" fulfillment option is shown. The bulk of the shopping process 400 may be implemented in a manner similar to that of shopping process 300. In particular, blocks 410, 420, 430, 440, 450, and 460 may be implemented in a manner similar to blocks 310, 320, 330, 340, 350, and 360 of FIG. 3. As such, the following description focuses upon aspects that differ between the two processes.

With the "carry with me" option, a customer at 425 may physically to take the item 53 with them after selecting the item 53 at 420 with the mobile computing device 20 and placing it in their virtual cart 22. For example, the customer may physically place the selected item 53 in a wheeled shopping cart, in a carried shopping basket, or merely carry the item 53 without the aid of a wheeled shopping cart or carried shopping basket. Thus, the selected item 53 is both virtual present in the virtual cart 22 and physically present with the customer. Thus, in response to paying for the "carry with me" items 53 in their virtual cart 22 at 440, the customer at 450 may receive one or more proofs of purchase for the purchased "carry with me" item 53 in their possession. Such proofs of purchase may include scannable codes for all "carry with me" items 53 or other indicators identifying the items 53 as paid.

After receiving the proofs of purchase, the customer at 455 may proceed to a security or validation point 56 (See, FIG. 1), which may be located near one or more exits of the store 50. The customer at the security/validation point 56 provides proof that the items 53 have been paid for. After providing proof of purchase, the customer at 460 may exit the store with the "carry with me" items 53. In some embodiments, the customer may merely show the proof of purchase received by the mobile computing device 20 to a store associate manning the security/validation point 56. The store associate may simply take a quick visual inspection of the items 53 in light of the presented proofs of purchase and permit the customer to exit if everything appears to be in order.

In other embodiments, the store associate may scan code(s) provided by the proofs of purchase as well as each item 53 in the customers possession to verify each item 53 has been paid for. In yet other embodiments, the security/validation point 56 may be completely automated with the customer merely scanning the present proofs of purchase at the security/validation point 56 in order to validate the contents of their shopping cart. Regardless of the actual implementation of the security/validation point 56, it should be appreciated that the process should be quick and nearly effortless while at the same time providing a sufficient deterrent and safeguard to thwart theft. In particular, the security/validation point process should be a quicker process than the typical POS terminal 51 checkout process and should be designed to handle a substantial flow of customers to ensure customers are not forced to wait a significant amount of time in order to validate their purchases.

Figure 5:
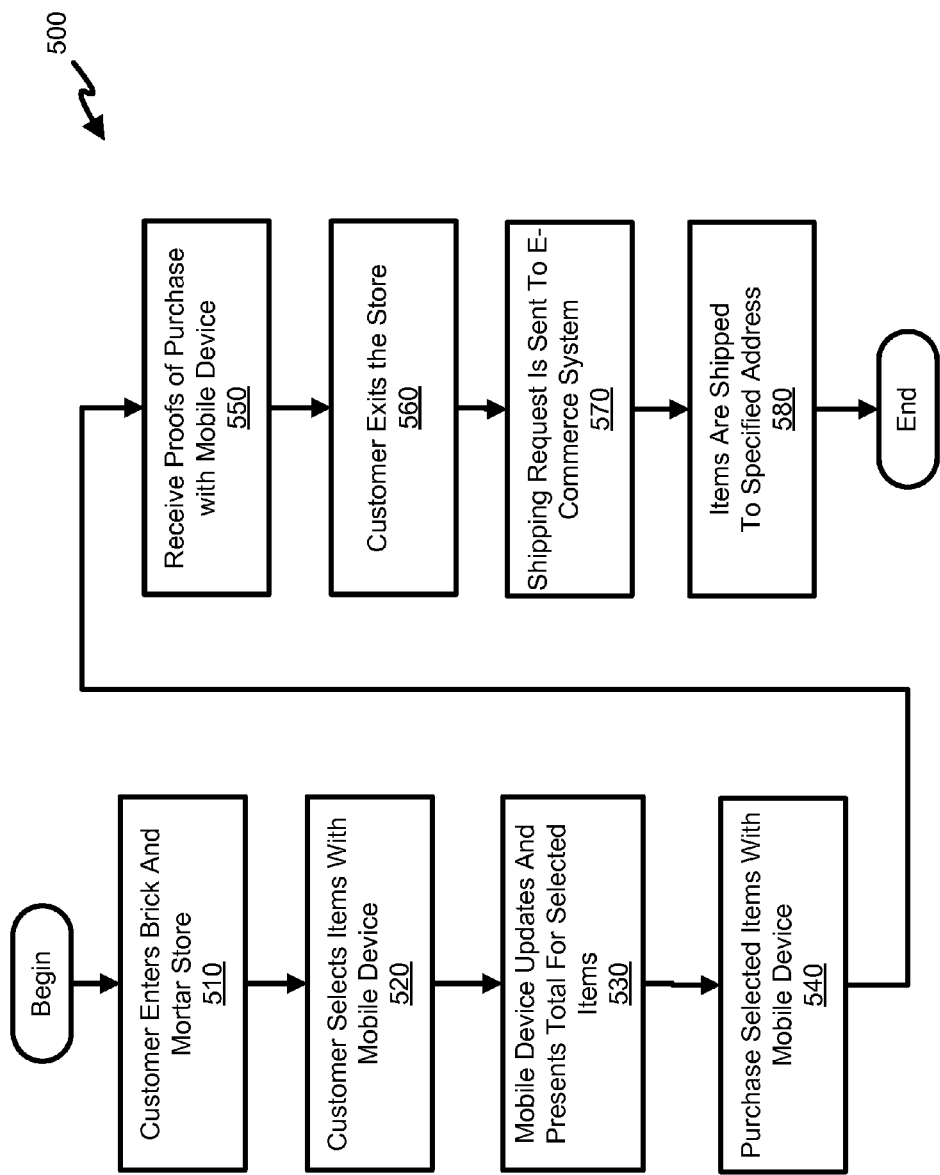
FIG. 5 shows additional details of a shopping process utilizing a "ship/deliver" fulfillment option suitable for the system of FIG. 1.

Referring now to FIG. 5, a shopping process 500 that highlights aspects of a "ship/deliver" fulfillment option is shown. The bulk of the shopping process 500 may be implemented in a manner similar to that of shopping process 300. In particular, blocks 510, 520, 530, 540, 550, and 560 may be implemented in a manner similar to blocks 310, 320, 330, 340, 350, and 360 of FIG. 3. As such, the following description focuses upon aspects that differ between the two processes.

With the "ship/deliver" option, the customer does not physically carry "shipped" items 53. Moreover, the customer does not leave the store 50 with such items, but instead such items 53 are delivered to an address specified by the customer. As shown in FIG. 5, the mobile computing device 20 and/or the e-commerce system 30 at 570 may generate a shipping request for purchased items 53 with the "shipped/deliver" fulfillment option. In particular, a fulfillment system of the e-commerce system 30 may receive such shipping requests and cause such items to be gathered from the store front, stock room, a central warehouse, and/or other location. The e-commerce system 30 at 580 may further cause such items 53 to be shipped to an address specified or otherwise associated with the customer.

For example, the e-commerce system 30 may maintain a customer profile 32 for the customer which includes various information about the customer such as home address and/or preferred shipping address. As such, the e-commerce system 30 at 580 may cause such items to be shipped to the preferred shipping address already associated with the customer. However, it should be appreciated that the mobile computing device 20 and/or e-commerce system 30 may permit the customer to specify a shipping address during the payment process at 540 or at some other time during the shopping process 500.

Figure 6:
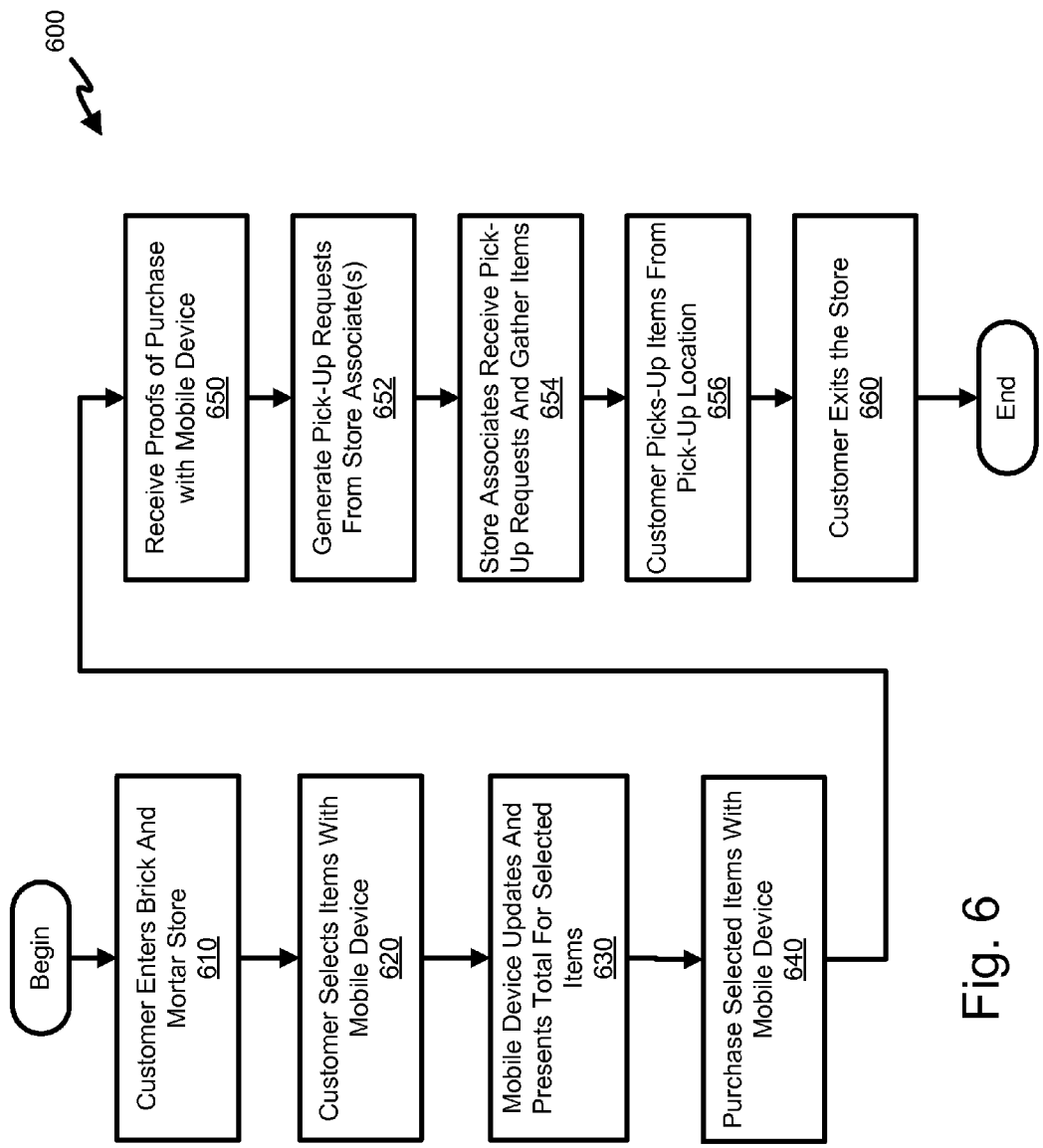
FIG. 6 shows additional details of a shopping process utilizing a "pick-up" fulfillment option suitable for the system of FIG. 1.

Referring now to FIG. 6, a shopping process 600 that highlights aspects of a "pick-up" fulfillment option is shown. The bulk of the shopping process 600 may be implemented in a manner similar to that of shopping process 300. In particular, blocks 610, 620, 630, 640, 650, and 660 may be implemented in a manner similar to blocks 310, 320, 330, 340, 350, and 360 of FIG. 3. As such, the following description focuses upon aspects that differ between the two processes.

With the "pick-up" option, the customer in a manner similar to the "ship/deliver" option does not carry "pick-up" items 53 through the store 50, but may pick-up the items 53 from a merchandise pick-up (MPU) location 58 at a later time. (See, FIG. 1.) In one embodiment, the e-commerce system 30 at 652 may generate pick-up requests for "pick-up" items 53 in the virtual cart 22 after the customer pays for such items 53. One or more store associate(s) at 654 may receive the requests and gather the "pick-up" items 53 identified in the received requests. The customer at 656 may then pick-up the gathered items 53 from a merchandise pick-up (MPU) location 58 prior to leaving the store 50 at 660. In some embodiments, an e-commerce system 30 may provide the customer with a designated time for pick-up in order to permit the store associate(s) time to gather the items 53 without requiring the customer to wait at the MPU location 58. In such embodiments, the customer may leave the store 50 and return at a later time and/or date to retrieve the items 53 at the designated time from the MPU location 58.

In yet further embodiments, the mobile computing device 20 and/or e-commerce system 30 may permit the customer to schedule a day, time, and location for pick-up. Such an embodiment may permit the customer to pick-up the items on a different day and possibly even at a different location thus permitting the store associates further time to gather the items 53 without requiring the customer to wait for them to gather such items. Such an embodiment may even permit obtaining "pick-up" items 53 from another store and/or an offsite warehouse, thus increasing the availability of items for purchase without requiring all such items be in stock or on display at a particular store 50.

The above shopping processes 300, 400, 500, and/or 600 beyond being useful for use in a brick-and-mortar store 50 such as a department store or grocery store may also be useful in and/or adapted for use in other contexts as well. For example, the shopping processes 300, 400, 500, and/or 600 may be adapted for using in a shopping mall having many separately operated stores 50. A customer may plan to shop at several stores throughout the mall. Conventionally, the customer would carry purchased items with them as they move from store to store. The above shopping processes 300, 400, 500, and/or 600 may be extended to all or a subset of the stores 50 in the mall so that the customer may shop at each of such stores 50 without physically carrying items 53 purchased at the participating stores 50. The customer instead may request purchased items 53 be shipped to a specified address or may arrange for pick-up of purchased items 53. In one embodiment, the participating stores may provide a centralized pick-up location 56 that permits a customer to pick-up items 53 purchased from each of the participating stores 50 from a single location.

As another example, the shopping processes 300, 400, 500, and/or 600 may be extended to airport shopping, vacation spot shopping, stadium shopping, and/or other venues where the customer would like to purchase a displayed item 53 but may find it otherwise inconvenient to carry the purchased item 53. With the shopping processes 300, 400, 500, and/or 600 such a customer may have the purchased items shipped to a specified address or arrange for pick-up of the purchased items 53 at a specified date, time, and/or location that is more convenient for the customer.

Enhanced Pick-Up Fulfillment

As noted above in regard to the shopping process 600, a customer may choose a "pick-up" fulfillment option for items in their virtual cart 22. While some of the above discussed embodiments permit a customer to schedule a date, time, and location for picking-up their items 53 in order to avoid waiting for store associates to gather the various items 53, many customers prefer to leave the brick-and-mortar store 50 with their purchased items 53. For such customers, reducing the time they must wait for store associates to gather the items 53 is important. Accordingly, the enhanced pick-up fulfillment process 700 depicted in FIG. 7 attempts to address this issue and reduce the time a customer waits for store associates to gather their items.

Figure 7:
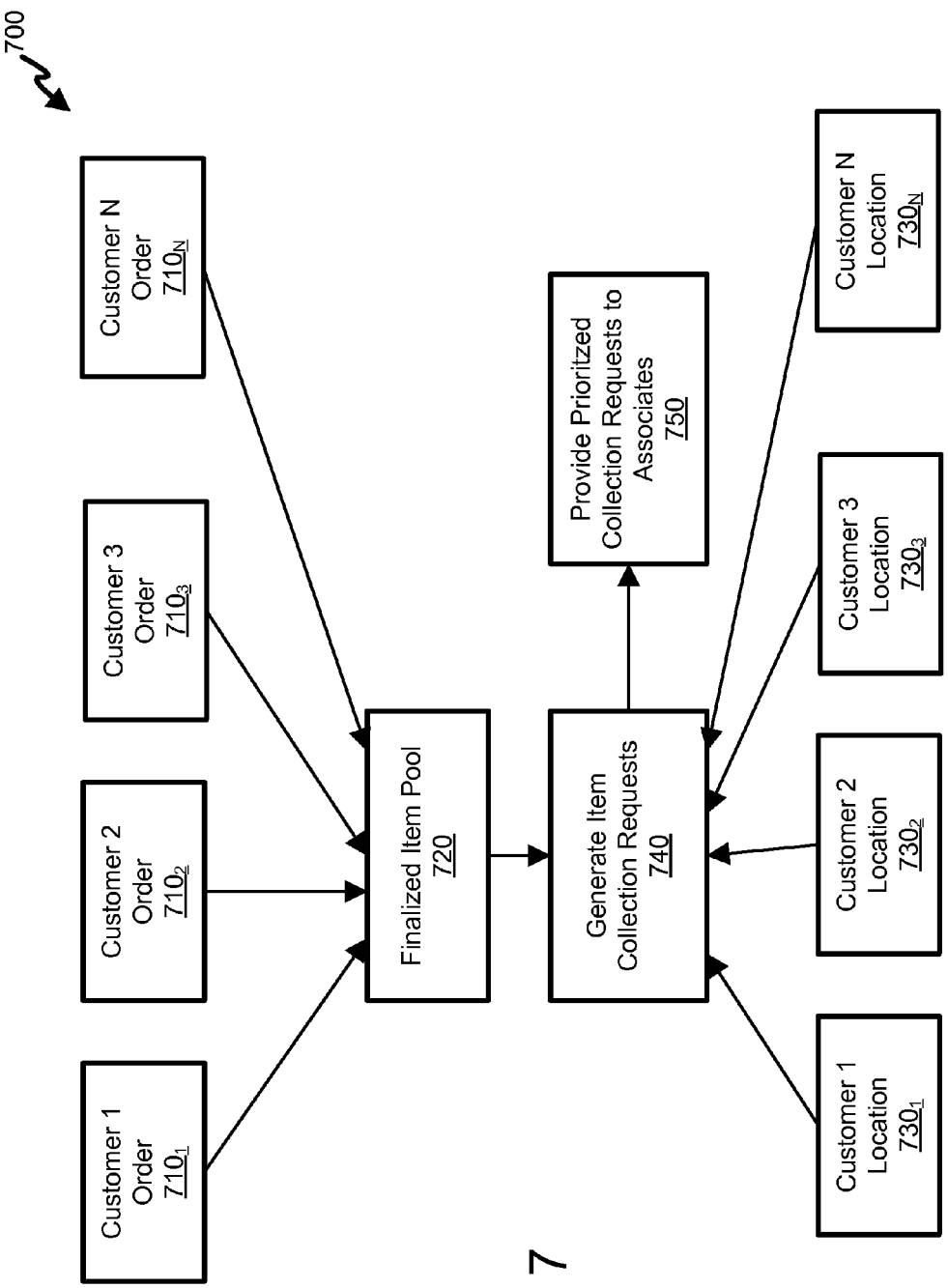
FIG. 7 shows additional details of enhanced pick-up or collection process suitable for the system of FIG. 1.

As shown in FIG. 7, the brick-and-mortar store 50 may have several customers $710_1, 710_2, 710_3 \ldots 710_N$ that are using mobile computing devices 20 to order "pick-up" items 53. In one embodiment, the mobile computing devices 20 may permit the customers to finalize items while they are still shopping at the store 50. As noted above, customers may place items 53 in their virtual cart 22 via various methods (e.g., scanning bar codes, tags, etc.). Simply placing an item in the virtual cart 22 in such embodiment does not generate a pick-up request. Instead, the mobile computing device 20 requires that the customer "finalize" the item 53 in the virtual cart 22. Such finalizing provides an indication that the customer truly intends to purchase the item 53. In some embodiment, "finalizing" may not require separate input from the customer. For example, the mobile computing device 22 may automatically finalize pick-up items 53 after the expiration of a predetermined time in the virtual cart 22. Such auto-finalizing is based on the assumption that if the item 53 has been in the virtual cart 22 for at least the predetermined time period, then such addition to the virtual cart 22 was unlikely a mistake and the customer is most likely intending to purchase the item 53. As shown, an e-commerce system 30 may receive pick-up requests for the finalized items from the customers $710_1, 710_2, 710_3 \ldots 710_N$ and place such requests in a finalized item pool 720.

FIG. 7 further indicates that the e-commerce system 30 may receive location information $730_1, 730_2, 730_3 \ldots 730_N$ for the customers $710_1, 710_2, 710_3 \ldots 710_N$. In one embodiment, the brick-and-mortar store 50 includes several WiFi base stations 42 distributed throughout the store 50. The mobile computing devices 20 interact with the e-commerce system 30 via such WiFi base stations 42. Based on signals received from the various WiFi base stations 42, the e-commerce system 30 may generally determine the location of each mobile client device 20 and therefore the location of the respective customers in the brick-and-mortar store 50.

Based on the pooled requests 720 and the received location information $730_1, 730_2, 730_3 \ldots 730_N$, the e-commerce system 30 at 740 may generate pick-up or item collection lists for store associates assigned to handle such requests. Moreover, the e-commerce system 30 at 750 may deliver such pick-up requests to mobile computing devices 20 used by such store associates. In generating such pick-up requests, the e-commerce system 30 at 740 may attempt to assign items 53 which are close to one another in the store to the same store associate for pick-up even if such items are for different customers. Moreover, the e-commerce system 30 may consider the current location of the store associates and assign items for pick-up to associates that are already near such items or already have items assigned to them that are in the vicinity.

Furthermore, the e-commerce system 30, in the process of generating and/or updating pick-up requests for store associates, may consider the location of the customers when prioritizing a pick-up sequence for the items to be picked-up or collected by the store associates. For example, the e-commerce system 30 may give higher priority to items 53 of a customer who is nearing the pick-up location 58. The e-commerce system 30 may further give higher priority to items 53 of a customer who appears to be nearly done with their shopping. The e-commerce system 30 may assess whether a customer is nearly done based on general shopping patterns for customers of the store 50 and/or based on shopping patterns for the particular customer during prior visits to the store 50.

Express Checkout

As discussed above, mobile computing devices 20 may permit a customer to purchase an item 53 in a brick-and-mortar store 50 without requiring the customer to physically place the item 53 in a shopping cart and/or physically take the item 53 to a checkout lane. The mobile computing devices 20 may further enhance this process by providing an express checkout and/or purchase option. For example, the mobile computing device 20 may provide a button, an item 53 may provide a scannable tag, or the computing device 20 and/or item 53 may provide other options which permit the customer to select, automatically pay for, and have delivered an item 53 per the customer's preferred fulfillment option. In such an embodiment, the e-commerce system 30 may maintain a customer profile 32 for each customer. Such profiles 32 may include payment information (e.g., credit card information), preferred fulfillment method (e.g. ship to home, pick-up, etc.), address for shipments, etc. Accordingly, a customer may merely scan or take a picture of an item 53 in order to purchase the item 53 and have such item delivered to them.

While the express checkout option may be used to enhance the customer's shopping experience in a brick-and-mortar store 50, the express checkout option in some embodiments may be extended to locations beyond the brick-and-mortar store 50. For example, the mobile computing device 20 may permit a user to simply take a picture of a shirt that someone is wearing at a party. Based on such picture, the e-commerce system 30 may identify the shirt or a similar shirt and automatically ship the identified shirt to the customer.

Extended Fulfillment

A brick-and-mortar store 50 that utilizes the shopping processes 300, 400, 500, and/or 600 may provide their customers with greater choice than is possible and/or practical with a convention shopping process. For example, a customer may wish to purchase a complete outfit (e.g., top, bottom, jewelry, and footwear). Despite identifying various items 53 of the outfit that the customer would like to purchase, the customer may be hesitant to purchase any of the identified items 53 because they are not completely satisfied with the color/size/pattern/print/texture/frill or some other characteristic of one or more of the items 53 which are currently available on the customer accessible shelves/racks of the brick-and-mortar store 50.

Via the shopping processes 300, 400, 500, and/or 600, the brick-and-mortar store 50 may leverage multiple fulfillment opportunities such as online, warehouse, in store (backroom), other nearby store locations, other participating retail stores, etc. in order to fulfill the customer's request for the entire outfit. In particular, a customer may scan an item 53 with their mobile computing device 20 and have the item 53 delivered to their preferred destination irrespective of fulfillment channel. Moreover, in case the exact item 53 being requested is not in stock, the e-commerce system 30 in some embodiments may recommend other suitable items to the customer taking into account print/pattern/color/fabric content/style/seasonality/ trends of the item 53 being scanned. Similarly, the mobile computing device 20 and the e-commerce system 30 may provide the customer with additional options such as the same style top in a different color, size, print, texture, etc. and/or may provide suggestions of tops that may be suitable for wearing with items (pants, shoes, etc.) already in the customer's virtual cart 22.

In some embodiment, the mobile computing device 20 may provide such personalized recommendations and/or search for items in the customer's size, etc. in response to a customer scanning a special tag of an item 53 and/or selecting a particular feature (e.g., pressing a button) of an application executed by the mobile computing device 20. For example, the mobile computing device 20 may automatically place an item 53 of the customer's size in the virtual cart 22 by scanning an "in my size" tag for the item 53. The mobile computing device 20 and/or e-commerce system 30 may utilize the customer's profile 32 and/or product data 34 to identify the appropriate size for the customer. Moreover, in determining appropriate size, the mobile computing device 20 and/or e-commerce system 30 may account for size variations across brands, styles, etc. It should be appreciated that such a feature also simplifies the process for the customer as the customer may place appropriately sized items 53 in their virtual cart 22 without first physically locating the appropriately sized item 53 in the store 50.

Item recommendations may be further based upon prior purchases of the customer as well as prior purchases of other customers. For example, the e-commerce system 30 may include data that shows a particular style of top is usually purchased in conjunction with the pants that are currently in the customer's virtual cart 22. While such suggestions may be biased toward items carried by the particular store 50, the item suggestions may further include items irrespective of the fulfillment channel (e.g., warehouse, other nearby store locations, affiliated online store, stores of other participating vendors, etc.). In some embodiments, the store 50 may earn affiliate income on items purchased from other vendors.

Customer Tracking to Enhance Recommendations and Sourcing

In some embodiments, the brick-and-mortar store 50 may use the enhanced shopping processes 300, 400, 500, and/or 600 to provide enhance recommendations to their customers and to better align the items 53 which are sourced for purchase in the store 50. In particular, as the customer is moving through the store 50, the e-commerce system 30 may monitor a customer's click stream data generated by the mobile computing device 20, perform eyeball tracking via a front facing camera of mobile computing device 20, and monitor item images or item barcodes provided by a rear facing camera of the mobile computing device 20. The e-commerce system 30 may utilize such data along with other data maintained for the customer and/or for the store 50 (e.g., apparel technical pack data) to build customer profiles 32. The e-commerce system 30 may use such customer profiles 32 to drive relevant personalized item recommendations for the customer while the customer is shopping in the store 50. The e-commerce system 30 may further use such data to analyzing popularity of existing merchandise and to influence purchasing/production of merchandise for future seasons.

The enhanced recommendation process may be utilized in a number of different situations. In particular, a customer may be shopping using their mobile computing device 20 in a brick-and-mortar store 50, at a commerce website, via a mobile application, through a mail order catalog, and/or some other shopping venue. Regardless of venue, the customer may use their mobile computing device 20 to capture a representation of a particular item. In response to such capture, the mobile computing device 20 and/or e-commerce system 30 may automatically apply characteristics of that item to augment a personal profile 32 maintained for that customer. The captured representation of the item may be an item image (partial or full), a barcode or tag on the item, or an augmented reality code. In particular, the mobile computing device 20 and/or e-commerce system 30 may identify various characteristics about the captured item such as brand, color, style, size, and seasonality and may build and/or update the customer's profile 32 based on such identified characteristics.

So from a customer's perspective, the customer may use the mobile computing device 20 as normal, and with their permission the mobile computing device 20 and/or e-commerce system 30 may collect relevant information in order to capture the shopping intent of the customer and couple such intent with relevant item attribute details in the background. As the mobile computing device 20 and/or e-commerce system 30 monitors such activity over a period of time, the customer's profile 32 gradually becomes more complete and increasingly provides a more accurate representation of customer preference. The mobile computing device 20 and/or e-commerce system 30, therefore, may use such customer profile data 32 to drive personalized item recommendations which may be delivered to the customer via the mobile computing device 20 on a real time basis as the customer is shopping via the respective venue (e.g., at brick-and-mortar store 50, a commerce website, etc.) Thus, the mobile computing device 20 and/or e-commerce system 30 may use a mix of information already know about the customer (e.g., their customer profile) and information being collected and processed in a real time fashion (e.g., which item is the customer looking at right now, what item did the customer scan, etc.) to drive personalized and relevant recommendations for items to purchase.

The mobile computing device 20 and/or e-commerce system 30 may further refine the personalized recommendations based upon an aggregation of the offline metrics such as, for example, purchasing behavior for all customers at a particular store, region or across all regions. Moreover, the e-commerce system 30 may further refine future purchasing and production based upon such data. For example, if the e-commerce system 30 realizes through analytics of the above data, that customers in a particular demographic prefer big & tall clothing and stores 50 in region only stock "regular" sizes, then the e-commerce system 30 may utilize such data to increase the stock of big & tall clothing in such stores 50 in order to better reflect customer demand or preferences for stores 50 in such region.

The e-commerce system 30 may gain even further insight as to customer preferences based on the customers reactions to recommendations delivered to the customer via the mobile computing device 20. Besides refining the customer's profiled based upon the customer's reaction to such recommendations, the e-commerce system 30 may further refine its understanding of customer preferences at both a very granular level (individual stores) as well at a macroscopic level (across all store locations, across Midwest stores, across west coast stores, etc.) and utilize such information to drive future design and purchase choices for seasonal merchandise like apparel.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices providing one or more aspects of the system 10 described above.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method utilizing a mobile computing device of a customer to enhance shopping in a brick-and-mortar store, the method comprising:
   reading, with the mobile computing device, a machine-readable code that identifies an item on display in the brick-and-mortar store;
   in response to said reading the machine-readable code, the mobile computing device updating a virtual cart for the customer to include the item identified by the machine-readable code;
   transmitting, from the mobile computing device, a finalized request that identifies one or more items that have spent a predetermined time in the virtual cart for a store associate to gather; and
   receiving payment for the one or more items in the virtual cart via the mobile computing device.

2. The method of claim 1, wherein said reading the machine-readable code comprises capturing, with a camera of the mobile computing device, a bar code, a Quick Response (QR) code, an Augmented Reality (AR) code, or another code placed on the item or otherwise associated with the item on display.

3. The method of claim 1, wherein said reading the machine-readable code comprises reading, with a reader of the mobile computing device, a radio frequency identifier (RFID), a near field communication (NFC) code, and/or another code placed on the item or otherwise associated with the item on display.

4. The method of claim 1, further comprising transmitting, from the mobile computing device, an indication that identifies one or more items in the virtual cart which the customer has requested to pick-up from a pick-up location.

5. The method of claim 1, further comprising transmitting, from the mobile computing device, an indication that identifies one or more items in the virtual cart which the customer has requested be shipped to a specified address.

6. The method of claim 1, further comprising transmitting, from the mobile computing device, an indication that identifies one or more items in the virtual cart which the customer plans to carry and which are not to be gathered by the store associate.

7. The method of claim 1 further comprising:
   receiving, with the mobile computing device, a proof of purchase for the one or more items in the virtual cart in response to said receiving payment; and
   presenting, with the mobile computing device, the proof of purchase at a verification location prior to the customer carrying the one or more items out of the brick-and-mortar store.

8. The method of claim 1, further comprising:
   receiving, with the mobile computing device, a recommendation for another item based on the one or more items in the virtual cart; and
   presenting the recommendation for the another item via the mobile computing device.

9. The method of claim 1, further comprising:
   tracking, with an e-commerce system, a plurality of mobile devices associated with a plurality of store associates to ascertain a location for each store associate of the plurality of store associates; and
   automatically assigning via the e-commerce system a store associate of the plurality of store associates to gather the one or more items based on the location of the store associate.

10. The method of claim 1, further comprising, in response to the finalized request, selecting, with an e-commerce system, a store associate from a plurality of store associates based on whether the one or more items to be gathered is in a vicinity of other items to be gathered by the store associate.

11. A non-transitory computer readable storage medium comprising a plurality of instructions, that in response to being executed, result in a mobile computing device of a customer:
   reading a machine-readable code that identifies an item on display in a brick-and-mortar store;
   in response to said reading the machine-readable code, adding the item identified by the machine-readable code to a virtual cart for the customer;
   after expiration of a predetermined time in the virtual cart, transmitting a request for a store associate to gather the item that has spent the predetermined time in virtual cart; and
   effecting payment for the item.

12. The non-transitory computer readable storage medium of claim 11, wherein the plurality of instructions, in response to being executed, further result in the mobile computing device reading the machine-readable code by capturing, with a camera of the mobile computing device, a bar code, a Quick Response (QR) code, an Augmented Reality (AR) code, or another code placed on the item or otherwise associated with the item on display.

13. The non-transitory computer readable storage medium of claim 11, wherein the plurality of instructions, in response to being executed, further result in the mobile computing device reading the machine-readable code by reading, with a reader of the mobile computing device, a radio frequency identifier (RFID), a near field communication (NFC) code, and/or another code placed on the item or otherwise associated with the item on display.

14. The non-transitory computer readable storage medium of claim 11, wherein the plurality of instructions, in response to being executed, further result in the mobile computing device transmitting an indication that identifies one or more items in the virtual cart which the customer has requested to pick-up from a pick-up location.

15. The non-transitory computer readable storage medium of claim 11, wherein the plurality of instructions, in response to being executed, further result in the mobile computing device transmitting an indication that identifies one or more items in the virtual cart which the customer has requested be shipped to a specified address.

16. The non-transitory computer readable storage medium of claim 11, wherein the plurality of instructions, in response to being executed, further result in the mobile computing device transmitting an indication that identifies one or more items in the virtual cart which the customer plans to carry and which are not to be gathered by the store associated.

17. The non-transitory computer readable storage medium of claim 11, wherein the plurality of instructions, in response to being executed, further result in the mobile computing device:
   receiving a proof of purchase for the one or more items in the virtual cart in response to said receiving payment; and
   presenting the proof of purchase at a verification location prior to the customer carrying the one or more items out of the brick-and-mortar store.

18. A shopping system for a brick-and-mortar store having a plurality of items on display, the system comprising:
   an e-commerce system; and
   a mobile computing device configured to:
      read a machine-readable code that identifies an item on display;
      in response to reading the machine-readable code, adding the item identified by the machine-readable code to a virtual cart for a customer;
      finalize an item in the virtual cart for the customer after the item has spent a predetermined time in the virtual cart; and
      communicate with the e-commerce system to request the finalized item be gathered and transferred to a pick-up location while the customer is still shopping, effectuate payment for the item after the customer is done shopping, and
      receive proof of purchase for the paid item.

19. The system of claim 18, further comprising:
   a plurality of mobile devices associated with a plurality of store associates;
   a plurality of wireless base stations configured to receive signals from the plurality of mobile devices;
   wherein the e-commerce system is configured to:
      track the plurality of mobile devices and the associated plurality of store associates based on signals received by the plurality of wireless base stations;
      ascertain a location for each store associate of the plurality of store associates based on the received signals; and
      assign a store associate of plurality of store associates to gather the item based on the location of the store associate.

20. The system of claim 18, further comprising:
   a plurality of mobile devices associated with a plurality of store associates;
   a plurality of wireless base stations configured to receive signals from the plurality of mobile devices;
   wherein the e-commerce system is configured to:
      track the plurality of mobile devices and the associated plurality of store associates based on signals received by the plurality of wireless base stations;
      ascertain a location for each store associate of the plurality of store associates based on the received signals, and in response to the finalize request; and
      select a store associate from a plurality of store associates based on whether the item to be gathered is in a vicinity of other items to be gathered by the store associate.

* * * * *